(12) United States Patent
Yamada (10) Patent No.: US 11,773,802 B2
(45) Date of Patent: Oct. 3, 2023

(54) INTERNAL COMBUSTION ENGINE

(71) Applicant: TOYOTA JIDOSHA KABUSHIKI KAISHA, Toyota (JP)

(72) Inventor: Ryota Yamada, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/929,039

(22) Filed: Sep. 1, 2022

(65) Prior Publication Data
US 2023/0118993 A1    Apr. 20, 2023

(30) Foreign Application Priority Data
Oct. 14, 2021    (JP) .................................. 2021-168930

(51) Int. Cl.
| | | |
|---|---|---|
| *F02D 41/30* | (2006.01) | |
| *F02B 23/10* | (2006.01) | |
| *F02M 53/04* | (2006.01) | |
| *F02M 21/02* | (2006.01) | |
| *F02M 69/04* | (2006.01) | |
| *F02D 19/06* | (2006.01) | |
| *F02D 41/40* | (2006.01) | |

(52) U.S. Cl.
CPC .......... *F02D 41/3094* (2013.01); *F02B 23/10* (2013.01); *F02D 19/0692* (2013.01); *F02M 21/0284* (2013.01); *F02M 53/043* (2013.01); *F02M 69/046* (2013.01); *F02B 2023/106* (2013.01); *F02D 41/402* (2013.01); *F02M 2700/077* (2013.01)

(58) Field of Classification Search
None
See application file for complete search history.

(56) References Cited

U.S. PATENT DOCUMENTS

| | | | | |
|---|---|---|---|---|
| 5,775,099 A | * | 7/1998 | Ito .......................... | F01N 3/0842 123/430 |
| 6,659,071 B2 | * | 12/2003 | LaPointe ............. | F02D 19/0647 123/305 |
| 6,684,852 B2 | * | 2/2004 | Wright .................. | F02D 41/402 123/295 |

(Continued)

FOREIGN PATENT DOCUMENTS

| | | | | |
|---|---|---|---|---|
| AU | 2005302987 A1 | * | 3/2007 | ........... F02D 41/024 |
| AU | 2006225897 A1 | * | 7/2007 | ............. F02D 37/02 |

(Continued)

*Primary Examiner* — Kevin R Steckbauer
(74) *Attorney, Agent, or Firm* — Oblon, McClelland, Maier & Neustadt, L.L.P.

(57) ABSTRACT

In a combustion cycle in which fuel for forming a homogenized air-fuel mixture in the combustion chamber is injected from the first fuel injector, ignition-use fuel for forming an ignition-use air-fuel mixture in the vicinity of the electrode part is injected from the second fuel injector, and lean combustion is performed by an excess air rate of 2.0 or more, the ignition-use fuel is injected by at least an injection rate of 1.0 mm$^3$/ms or more for a duration of 250 µs or more in an interval from a crank angle advanced by exactly 20 degrees from an ignition timing of the spark plug to the ignition timing, and the quantity of the ignition-use fuel is 2.0 mm$^3$/st or less.

4 Claims, 3 Drawing Sheets

(56) References Cited

U.S. PATENT DOCUMENTS

| | | | | |
|---|---|---|---|---|
| 7,143,739 B2* | 12/2006 | Brachert | ............ | F02D 13/0265 |
| | | | | 123/295 |
| 7,198,031 B2* | 4/2007 | Saito | .................. | F02M 69/044 |
| | | | | 123/90.15 |
| 7,412,821 B2* | 8/2008 | Araki | ................ | F02D 41/3094 |
| | | | | 60/284 |
| 7,653,475 B2* | 1/2010 | Hokuto | ............... | F02D 41/1475 |
| | | | | 123/674 |
| 7,716,924 B2* | 5/2010 | Tanaka | ............... | B01D 53/9495 |
| | | | | 60/285 |
| 8,261,532 B2* | 9/2012 | Fukuda | ............... | F01N 3/0871 |
| | | | | 60/285 |
| 8,904,995 B2* | 12/2014 | Nada | ................... | F02D 41/365 |
| | | | | 123/305 |
| 8,935,996 B2* | 1/2015 | Mulye | ................. | F02D 41/1446 |
| | | | | 123/25 C |
| 9,194,339 B2* | 11/2015 | Mulye | ................. | F02D 41/3094 |
| 9,303,581 B2* | 4/2016 | Glugla | ................... | F02P 5/045 |
| 9,371,795 B2* | 6/2016 | Nada | ................... | F02D 41/3035 |
| 9,726,076 B2* | 8/2017 | Mulye | ................. | F02D 41/1441 |
| 9,739,251 B2* | 8/2017 | Glugla | ................. | F02D 41/30 |
| 9,790,868 B2* | 10/2017 | Huang | ................. | F02P 19/026 |
| 10,094,323 B2* | 10/2018 | Urano | ................. | F02D 35/028 |
| 10,202,910 B2* | 2/2019 | Leone | ................. | F02D 35/021 |
| 10,309,322 B2* | 6/2019 | Hoshi | ................. | F02D 41/064 |
| RE47,540 E* | 7/2019 | Mulye | ................. | F02M 25/035 |
| 10,378,436 B2* | 8/2019 | Mulye | ................. | F02M 25/022 |
| 10,408,185 B2* | 9/2019 | Kassai | ................ | F02D 41/34 |
| 10,697,384 B2* | 6/2020 | Higuchi | ............... | F02D 41/024 |
| 10,844,804 B2* | 11/2020 | Pursifull | ............ | F02D 41/3809 |
| 10,900,436 B2* | 1/2021 | Pursifull | ............ | F02D 41/3094 |
| 11,143,135 B2* | 10/2021 | Pursifull | ............ | F02D 41/2474 |
| 11,274,623 B1* | 3/2022 | Kiwan | ................. | F02D 41/38 |
| 11,319,893 B1* | 5/2022 | Pursifull | ............ | F02D 41/3094 |
| 11,346,297 B1* | 5/2022 | Pursifull | ............ | F02D 41/221 |
| 11,466,639 B2* | 10/2022 | Kiwan | ............... | F02D 41/2451 |
| 2002/0020388 A1* | 2/2002 | Wright | ............... | F02D 41/3035 |
| | | | | 123/304 |
| 2002/0040692 A1* | 4/2002 | LaPointe | ............. | F02D 35/028 |
| | | | | 123/431 |
| 2006/0207240 A1* | 9/2006 | Araki | .................. | F02D 37/02 |
| | | | | 60/284 |
| 2006/0207241 A1* | 9/2006 | Araki | .................. | F02M 63/029 |
| | | | | 60/284 |
| 2006/0219215 A1* | 10/2006 | Brachert | ............ | F02D 41/3047 |
| | | | | 123/304 |
| 2006/0225703 A1* | 10/2006 | Saito | .................. | F02D 41/3094 |
| | | | | 123/431 |
| 2007/0214769 A1* | 9/2007 | Fukuda | ............... | F01N 3/0885 |
| | | | | 60/274 |
| 2008/0041044 A1* | 2/2008 | Tanaka | ............... | B01D 53/9495 |
| | | | | 60/301 |
| 2009/0000595 A1* | 1/2009 | Ashizawa | ............ | F02D 35/025 |
| | | | | 123/435 |
| 2009/0138181 A1* | 5/2009 | Hokuto | ............... | F02D 41/1475 |
| | | | | 60/299 |
| 2012/0016571 A1* | 1/2012 | Nada | ................... | F02D 41/3035 |
| | | | | 701/104 |
| 2012/0143479 A1* | 6/2012 | Nada | ................... | F02D 41/3035 |
| | | | | 701/104 |
| 2012/0260886 A1* | 10/2012 | Mulye | ................. | F02D 41/0025 |
| | | | | 123/25 C |
| 2013/0319376 A1* | 12/2013 | Mathey | ............... | F02D 41/3047 |
| | | | | 123/472 |
| 2015/0020769 A1* | 1/2015 | Huang | ................ | F02B 23/0669 |
| | | | | 123/145 R |
| 2015/0075492 A1* | 3/2015 | Glugla | ................. | F02P 5/1527 |
| | | | | 123/349 |
| 2015/0128897 A1* | 5/2015 | Mulye | ................. | F02M 25/028 |
| | | | | 123/25 A |
| 2016/0076440 A1* | 3/2016 | Mulye | ................. | F02D 35/025 |
| | | | | 123/25 A |
| 2016/0186673 A9* | 6/2016 | Huang | ............... | F02M 61/1826 |
| | | | | 123/145 R |
| 2016/0215748 A1* | 7/2016 | Glugla | ................. | F02D 41/34 |
| 2016/0348604 A1* | 12/2016 | Higuchi | ............... | F02D 41/402 |
| 2017/0276098 A1* | 9/2017 | Tanaka | ............... | F02D 41/3094 |
| 2017/0314499 A1* | 11/2017 | Urano | ................. | F02D 35/023 |
| 2017/0362997 A1* | 12/2017 | Mulye | ................ | F02D 35/025 |
| 2018/0298832 A1* | 10/2018 | Hoshi | ................. | F02P 5/1504 |
| 2019/0032622 A1* | 1/2019 | Kassai | ................ | F02D 41/0007 |
| 2020/0003112 A1* | 1/2020 | Mulye | ................. | F02D 41/3094 |
| 2020/0291885 A1* | 9/2020 | Pursifull | ............ | F02M 65/003 |
| 2020/0291886 A1* | 9/2020 | Pursifull | ............ | F02D 41/0085 |
| 2021/0017930 A1* | 1/2021 | Pursifull | ............ | F02D 41/3809 |
| 2022/0145822 A1* | 5/2022 | Kiwan | ................. | F02D 41/22 |

FOREIGN PATENT DOCUMENTS

| | | | | |
|---|---|---|---|---|
| CN | 101243250 A | * | 8/2008 | ......... F02D 41/1475 |
| CN | 103857895 B | * | 9/2016 | ......... F02D 13/0215 |
| CN | 106499531 A | * | 3/2017 | ......... F02D 41/0025 |
| CN | 105089903 B | * | 12/2018 | ............ F02B 17/005 |
| CN | 109538347 A | * | 3/2019 | ................ F01L 1/34 |
| CN | 114458466 A | * | 5/2022 | ............. F02D 41/22 |
| CN | 114483286 A | * | 5/2022 | |
| CN | 115387924 A | * | 11/2022 | ............. F02D 41/20 |
| DE | 19519663 A1 | * | 5/1996 | ............... F02B 1/12 |
| DE | 10141888 A1 | * | 4/2003 | ......... F02D 41/3029 |
| DE | 10350797 A1 | * | 5/2005 | ........... F02B 23/08 |
| DE | 102004062095 A1 | * | 7/2006 | ........... F02B 23/101 |
| DE | 102015110792 A1 | * | 1/2016 | ............ F02D 17/02 |
| DE | 102015110793 A1 | * | 1/2016 | ............ F02D 17/02 |
| DE | 102018004145 A1 | * | 11/2019 | |
| DE | 102021128598 A1 | * | 5/2022 | ............. F02D 41/22 |
| DE | 102022111025 A1 | * | 11/2022 | ............. F02D 41/20 |
| EP | 1989430 B1 | * | 10/2016 | ......... F02D 41/1475 |
| EP | 3118440 A1 | * | 1/2017 | ........... F01N 3/0885 |
| EP | 2044313 B1 | * | 10/2018 | ......... F02D 41/064 |
| FR | 3035683 A1 | * | 11/2016 | ............ F02B 31/04 |
| JP | 62-93164 U | | 6/1987 | |
| JP | 10252476 A | * | 9/1998 | ......... F02B 23/0663 |
| JP | 2001-182588 A | | 7/2001 | |
| JP | 2001182588 A | * | 7/2001 | |
| JP | 2003013784 A | * | 1/2003 | ............ F02D 35/027 |
| JP | 2003013785 A | * | 1/2003 | ............ F02D 35/027 |
| JP | 2004027911 A | * | 1/2004 | ............ F02M 69/046 |
| JP | 2004190587 A | * | 7/2004 | ......... F02D 41/3094 |
| JP | 2004197597 A | * | 7/2004 | ................ F02B 1/12 |
| JP | 2004197599 A | * | 7/2004 | ................ F02B 1/12 |
| JP | 2004239237 A | * | 8/2004 | ................ F02B 1/12 |
| JP | 2004239238 A | * | 8/2004 | ................ F02B 1/12 |
| JP | 2004308510 A | * | 11/2004 | ............ F02D 15/00 |
| JP | 2004308558 A | * | 11/2004 | ......... F02D 41/3094 |
| JP | 2005054615 A | * | 3/2005 | ......... F02D 41/0007 |
| JP | 3661200 B2 | * | 6/2005 | ............ F02D 41/06 |
| JP | 2005146885 A | * | 6/2005 | ......... F02D 41/1498 |
| JP | 2005337104 A | * | 12/2005 | ......... F02D 41/3094 |
| JP | 2006057594 A | * | 3/2006 | ......... F02D 41/3094 |
| JP | 2006258019 A | * | 9/2006 | |
| JP | 2006258031 A | * | 9/2006 | |
| JP | 3852363 B2 | * | 11/2006 | ............. F02B 17/00 |
| JP | 2007032316 A | * | 2/2007 | |
| JP | 3920526 B2 | * | 5/2007 | ............. F02D 35/02 |
| JP | 3938736 B2 | * | 6/2007 | ........... F02D 31/007 |
| JP | 3975702 B2 | * | 9/2007 | ......... F02D 41/3041 |
| JP | 2010038001 A | * | 2/2010 | |
| JP | 2010043588 A | * | 2/2010 | |
| JP | 2010043602 A | * | 2/2010 | |
| JP | 4423816 B2 | * | 3/2010 | ......... F02D 41/3029 |
| JP | 2010196659 A | * | 9/2010 | ......... F02D 41/3029 |
| JP | 2012041846 A | * | 3/2012 | ......... F02D 41/3094 |
| JP | 2012207631 A | * | 10/2012 | |
| JP | 2014015942 A | * | 1/2014 | |
| JP | 2015-21389 A | | 2/2015 | |
| JP | 2015021389 A | * | 2/2015 | |
| JP | 2016031067 A | * | 3/2016 | |
| JP | 2016044671 A | * | 4/2016 | |
| JP | 2016102471 A | * | 6/2016 | |
| JP | 2018031363 A | * | 3/2018 | ......... F02D 41/1454 |
| JP | 2019031918 A | * | 2/2019 | ......... F02D 41/0037 |

(56) References Cited

FOREIGN PATENT DOCUMENTS

| RU | 2688068 C2 * | 5/2019 | ........... F02D 35/027 |
|----|--------------|--------|-------------------------|
| WO | WO-0186127 A2 * | 11/2001 | ................ F02B 1/04 |
| WO | WO-0186128 A2 * | 11/2001 | ................ F02B 1/04 |
| WO | WO-2005090776 A1 * | 9/2005 | ........... F02D 41/008 |
| WO | WO-2005124127 A1 * | 12/2005 | ......... F02D 41/0032 |
| WO | WO-2006001495 A1 * | 1/2006 | ......... B01D 53/9495 |
| WO | WO-2007099425 A1 * | 9/2007 | ......... F02D 41/1475 |
| WO | WO-2007105080 A2 * | 9/2007 | ........... F02D 35/025 |
| WO | WO-2009011452 A2 * | 1/2009 | ............. F02D 37/02 |
| WO | WO-2013116941 A1 * | 8/2013 | ......... F02B 23/0639 |
| WO | WO 2017/134822 A1 | 8/2017 | |
| WO | WO-2017134822 A1 * | 8/2017 | ............. F02D 15/02 |
| WO | WO-2018066328 A1 * | 4/2018 | ........... F02B 17/005 |

* cited by examiner

TUMBLE FLOW

INTERNAL COMBUSTION ENGINE

FIELD

The present disclosure relates to an internal combustion engine.

BACKGROUND

Japanese Unexamined Patent Publication No. 2015-21389 discloses a conventional internal combustion engine which is configured so that an air-fuel ratio of an inside of a combustion chamber as a whole becomes a stoichiometric air-fuel ratio by injecting 80 to 90% of a total injection quantity per combustion cycle by a first injection performed in an intake stroke so as to form a homogeneous lean air-fuel mixture at the inside of the combustion chamber and injecting 10 to 20% of the total injection quantity by a second injection performed in a compression stroke to form a rich air-fuel mixture in the surroundings of a spark plug. According to Japanese Unexamined Patent Publication No. 2015-21389, due to this constitution, it is possible to stabilize combustion and keep smoke from being generated.

SUMMARY

By performing lean combustion forming and burning an air-fuel mixture leaner than a stoichiometric air-fuel ratio inside a combustion chamber as a whole, it is possible keep down the amount of NOx exhausted. By forming a rich air-fuel mixture in the surroundings of a spark plug by a second injection performed in a compression stroke like in the above-mentioned conventional internal combustion engine, it is possible to stabilize the combustion even when performing lean combustion.

However, if trying to inject 10 to 20% of the entire injection quantity by a second injection so as to stabilize lean combustion like in the above-mentioned conventional internal combustion engine, the second injected fuel quantity will become too great and a partially rich air-fuel mixture is liable to end up being formed at a location other than the surroundings of the spark plug in the combustion chamber. As a result, the combustion temperature at the location where a rich air-fuel mixture is formed ends up becoming higher and the amount of NOx exhausted is liable to be unable to be sufficiently suppressed.

The present disclosure was made focusing on such a problem and has as its object to secure combustion stability at the time of lean combustion while keeping the amount of NOx exhausted down to a certain level or less.

To solve the above problem, an internal combustion engine according to one aspect of the present disclosure is provided with an engine body, a spark plug in which an electrode part is placed so as to approach a combustion chamber of the engine body, a first fuel injector injecting fuel into an intake passage or combustion chamber of the engine body, and a second fuel injector injecting fuel into the combustion chamber. In this internal combustion engine, in a combustion cycle in which fuel for forming a homogenized air-fuel mixture in the combustion chamber is injected from the first fuel injector, ignition-use fuel for forming an ignition-use air-fuel mixture in the vicinity of the electrode part is injected from the second fuel injector, and lean combustion is performed by an excess air rate of 2.0 or more, the ignition-use fuel is injected by at least an injection rate of 1.0 mm$^3$/ms or over a duration of 250 µs or more in an interval from a crank angle advanced by exactly 20 degrees from an ignition timing of the spark plug to the ignition timing, and the quantity of the ignition-use fuel is 2.0 mm$^3$/st or less.

According to this aspect of the present disclosure, it is possible to keep the quantity of ignition-use fuel down to a certain level or less while forming an ignition-use air-fuel mixture having an excess air rate able to be stably ignited by a spark plug in the vicinity of the spark plug. For this reason, it is possible to secure combustion stability at the time of lean combustion while keeping the amount of NOx exhausted down to a certain level or less.

DESCRIPTION OF EMBODIMENTS

Below, embodiments of the present disclosure will be explained in detail while referring to the drawings. Note that, in the following explanation, similar component elements are assigned the same reference notations.

First Embodiment

Figure 1:
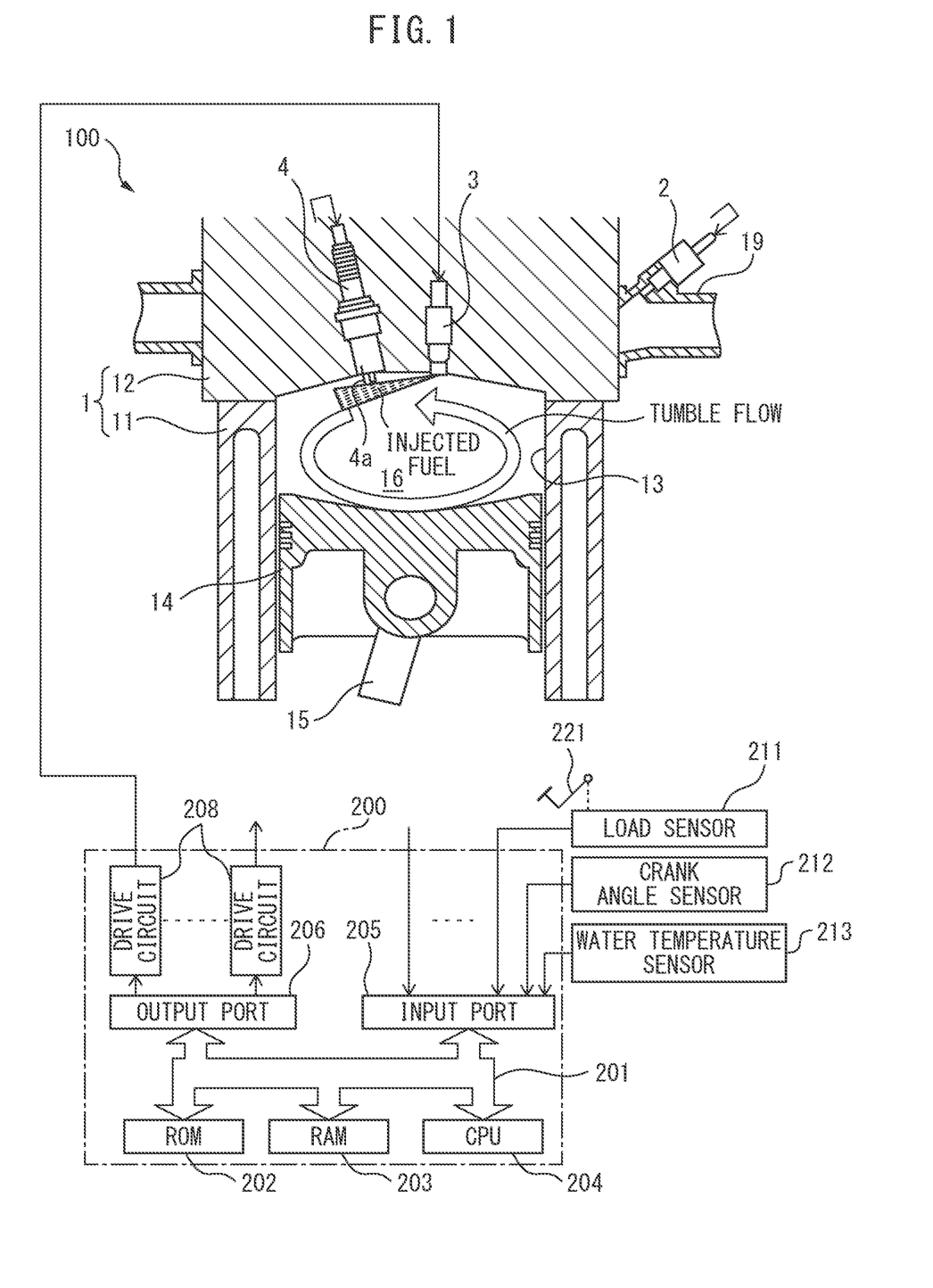
FIG. 1 is a schematic view of the configuration of a spark ignition type of internal combustion engine according to a first embodiment of the present disclosure and an electronic control unit for controlling the internal combustion engine.

FIG. 1 is a schematic view of the configuration of a spark ignition type of internal combustion engine 100 according to a first embodiment of the present disclosure.

As shown in FIG. 1, the internal combustion engine 100 is provided with an engine body 1, a first fuel injector 2, a second fuel injector 3, a spark plug 4, and an electronic control unit 200.

The engine body 1 is provided with a cylinder block 11 and a cylinder head 12 fixed to the cylinder block 11.

Figure 2:
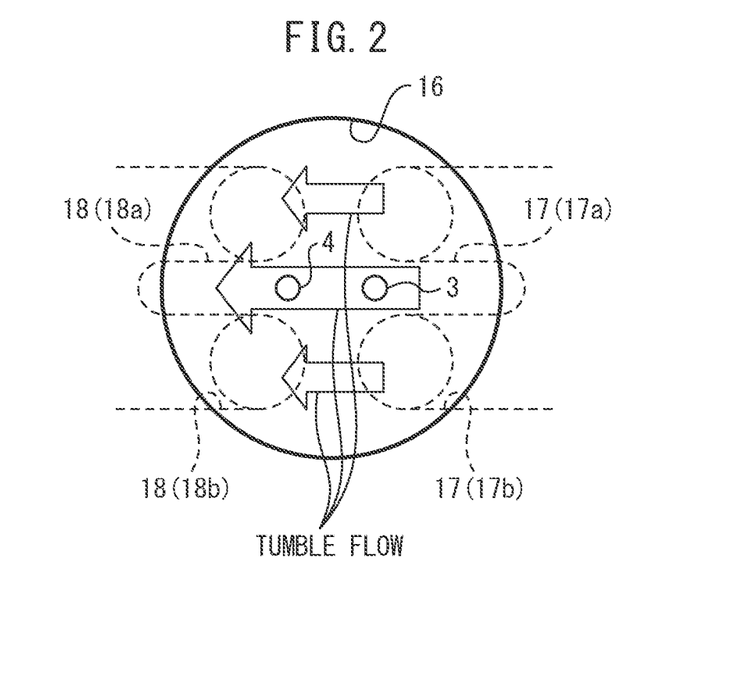
FIG. 2 is a schematic view of a combustion chamber seen from a cylinder head side.

The cylinder block 11 is formed with one or more cylinders 13. At the inside of each cylinder 13, a piston 14 is housed receiving the combustion pressure and moving back and forth at the inside of the cylinder 13. The piston 14 is connected through a connecting rod 15 to a not shown crankshaft. Due to the crankshaft, the back-and-forth motion of the piston 14 is converted to rotary motion. The space defined by an inside wall surface of the cylinder head 12, an inside wall surface of the cylinder 13, and a crown surface of the piston 14 forms a combustion chamber 16. FIG. 2 is a schematic view of this combustion chamber 16 seen from the cylinder head 12 side.

The cylinder head 12 is formed with an intake port 17 (see FIG. 2) forming part of an intake passage and an exhaust port 18 (see FIG. 2) forming part of an exhaust passage. The intake port 17 and the exhaust port 18 are respectively split into two inside of the cylinder head 12. At the combustion chamber 16, a pair of intake ports 17a, 17b and a pair of exhaust port 18a, 18b split into two are formed.

In the present embodiment, the cross-sectional shape of the intake port 17 or the cross-sectional shape of the combustion chamber 16 is adjusted so that a tumble flow is formed inside the combustion chamber 16 due to the intake air flowing through the intake port 17 to the inside of the combustion chamber 16. The tumble flow according to the present embodiment, as shown by the arrow in FIG. 1, flows from the intake port 17 to the inside of the combustion chamber 16, then first flows along the top surface of the combustion chamber 16 (inside wall surface of cylinder head 12) from the intake port 17 side (right side in figure) to the exhaust port 18 side (left side in figure), then flows along the inside wall of the cylinder 13 at the exhaust port 18 side to the piston 14 side. Further, it flows along the crown surface of the piston 14 from the exhaust port 18 side to the intake port 17 side, then flows along the inside wall surface of the cylinder 13 at the intake port 17 side to the intake port 17 side.

Note that the method of forming the tumble flow inside the combustion chamber 16 is not limited to the method of adjusting the cross-sectional shape of the intake port 17 or the cross-sectional shape of the combustion chamber 16 in this way. For example, it is also possible to form it by providing inside the intake port 17 a control valve for creating a biased flow of intake air flowing through the inside of the intake port 17 and adjusting the opening degree of that control valve.

Further, while not shown, the cylinder head 12 has an intake valve for opening and closing an opening of the combustion chamber 16 and the intake port 17, an exhaust valve for opening and closing an opening of the combustion chamber 16 and the exhaust port 18, an intake camshaft for driving operation of the intake valve, and an exhaust camshaft for driving operation of the exhaust valve.

The first fuel injector 2 is for example attached to an intake manifold 19 forming part of the intake passage so as to be able to inject fuel to the inside of the intake port 17. The opening time (injection quantity) and opening timing (injection timing) of the first fuel injector 2 are changed by control signals from the electronic control unit 200. If the first fuel injector 2 is opened, fuel is injected from the first fuel injector 2 to the inside of the intake port 17. That fuel is supplied to the combustion chamber 16. Note that, the first fuel injector 2 may for example also be attached to the cylinder head 12 so as to directly inject fuel into the combustion chamber 16.

The second fuel injector 3 is attached to the cylinder head 12 so as to be able to inject fuel in the same direction as the direction of the tumble flow flowing along the top surface of the combustion chamber 16 from the intake port 17 side to the exhaust port 18 side and, further, so as to be able to directly inject fuel toward the space in the vicinity of the electrode part 4a of the spark plug 4. In the present embodiment, the second fuel injector 3, as shown in FIG. 2, is attached between the pair of intake ports 17a, 17b. The opening time (injection quantity) and opening timing (injection timing) of the second fuel injector 3 are changed by control signals from the electronic control unit 200. If the second fuel injector 3 is opened, fuel is injected from the second fuel injector 3 to inside the combustion chamber 16. That fuel is supplied to the combustion chamber 16.

The spark plug 4 is attached to the cylinder head 12 so that the electrode part 4a approaches the combustion chamber 16. In the present embodiment, the spark plug 4, as shown in FIG. 2, is attached between the pair of exhaust ports 18a, 18b. The spark plug 4 generates a spark inside the combustion chamber 16 to ignite the air-fuel mixture of the fuel and air formed inside the combustion chamber 16. The ignition timing of the spark plug 4 is controlled to any timing by a control signal from the electronic control unit 200.

The electronic control unit 200 is comprised of a digital computer provided with components connected with each other by a bidirectional bus 201 such as a ROM (read only memory) 202, RAM (random access memory) 203, CPU (microprocessor) 204, input port 205, and output port 206.

The input port 205 receives as input as the signal for detecting the engine load an output signal of a load sensor 211 generating an output voltage proportional to the amount of depression of an accelerator pedal 221 (below, referred to as the "amount of accelerator depression"). Further, the input port 205 receives as input as the signal for detecting the engine speed etc. an output signal of a crank angle sensor 212 generating an output pulse each time a crankshaft of the engine body 1 rotates by for example 15°. Further, the input port 205 receives as input as the signal for detecting the temperature of the engine body 1 an output signal of a water temperature sensor 213 detecting the temperature of cooling water for cooling the engine body 1 (below, referred to as the "engine cooling water temperature"). Note that, the signal for detecting the temperature of the engine body 1 is not limited to the output signal of the water temperature sensor 213. For example, if an oil temperature sensor for detecting the temperature of lubrication oil for lubricating friction sliding parts of the engine body 1, the output signal of that oil temperature sensor may also be used. In this way, the input port 205 receives as input the output signals of various sensors required for control of the internal combustion engine 100.

The output port 206 is connected through a corresponding drive circuit 208 to the first fuel injector 2 or second fuel injector 3, spark plug 4, and other controlled parts.

The electronic control unit 200 outputs control signals for controlling the controlled parts from the output port 20 based on the output signals of the various sensors input to the input port 205 so as to control the internal combustion engine 100.

Below, control of the internal combustion engine 100 performed by the electronic control unit 200 will be explained.

The electronic control unit 200 switches the operating mode of the engine body 1 to the stoichiometric combustion mode or lean combustion mode in accordance with the temperature of the engine body 1 (in the present embodiment, the engine cooling water temperature). Specifically, if the temperature of the engine body 1 is less than a predetermined temperature, that is, if at the time of a cold engine where the ignitability of the air-fuel mixture and in turn the combustion stability relatively fall, the electronic control unit 200 switches the operating mode of the engine body 1 to the stoichiometric combustion mode. On the other hand, if the temperature of the engine body 1 is a predetermined temperature or more, the electronic control unit 200 switches the operating mode of the engine body 1 to the lean combustion mode.

The electronic control unit 200 forms a homogenized air-fuel mixture of the stoichiometric air-fuel ratio or the vicinity of the stoichiometric air-fuel ratio in the combustion chamber 16 when the operating mode is the stoichiometric combustion mode and ignites the homogenized air-fuel mixture to cause combustion by flame propagation for homogenized combustion so as to operate the engine body 1.

Specifically, when the operating mode is the stoichiometric combustion mode, the electronic control unit 200 injects fuel of the target fuel injection quantity from the first fuel injector 2 in accordance with the demanded torque at any time period from the exhaust stroke of the previous combustion cycle to the intake stroke of the current combustion cycle so as to form the homogenized air-fuel mixture of the stoichiometric air-fuel ratio or the vicinity of the stoichiometric air-fuel ratio in the combustion chamber 16. Further, the electronic control unit 200 ignites that homogenized air-fuel mixture by the spark plug 4 at the optimal ignition timing (if the optimal ignition timing is advanced from a knock limit ignition timing, the knock limit timing) to thereby cause combustion by flame propagation and operate the engine body 1.

On the other hand, when the operating mode is the lean combustion mode, the electronic control unit 200 forms a stratified air-fuel mixture in the combustion chamber 16 leaner than the stoichiometric air-fuel ratio and causing the presence of an air-fuel mixture (second air-fuel mixture) with a fuel ratio higher than the surrounding air-fuel mixture (first air-fuel mixture) in the vicinity of the electrode part 4a of the spark plug 4 and ignites that stratified air-fuel mixture to cause combustion by flame propagation as lean combustion and operate the engine body 1.

Figure 3:
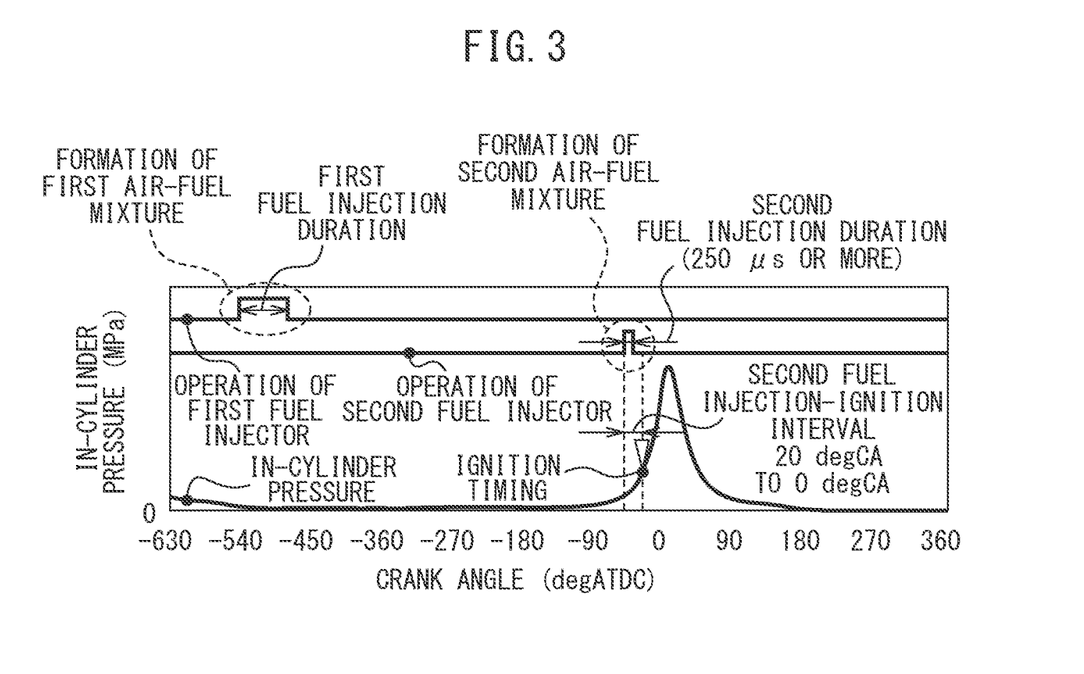
FIG. 3 is a view showing one example of fuel injection timings and ignition timings of a first fuel injector and a second fuel injector at the time of a lean combustion mode according to the first embodiment of the present disclosure plotting an in-cylinder pressure MPa at the ordinate and a crank angle deg. ATDC at the abscissa.

FIG. 3 is a view showing one example of fuel injection timings and ignition timings of the first fuel injector 2 and the second fuel injector 3 at the time of a lean combustion mode plotting an in-cylinder pressure MPa at the ordinate and a crank angle deg. ATDC (after top dead center) at the abscissa.

As shown in FIG. 3, when the operating mode is the lean combustion mode, the electronic control unit 200 first injects the first fuel from the first fuel injector 2 at any time period from the exhaust stroke of the previous combustion cycle to the intake stroke of the current combustion cycle so as to make the first fuel diffuse throughout the combustion chamber 16 and form a homogenized air-fuel mixture (below, referred to as the "first air-fuel mixture") leaner than the stoichiometric air-fuel ratio in the combustion chamber 16.

Next, the electronic control unit 200 injects the second fuel for ignition assist-use (ignition-use fuel) from the second fuel injector 3 toward the space in the vicinity of the electrode part 4a of the spark plug 4 during the compression stroke (in the present embodiment, in the time period from before 20 deg. C. (crank angle) of the ignition timing to the ignition timing). Due to this, before the second fuel diffuses in the combustion chamber 16 as a whole, an air-fuel mixture with a fuel ratio higher than the first air-fuel mixture (below, referred to as the "second air-fuel mixture") is formed temporarily in the vicinity of the electrode part 4a of the spark plug 4 and a stratified air-fuel mixture is formed inside the combustion chamber 16. The excess air rate $\lambda_0$ of the stratified air-fuel mixture is set to 2.0 or more. In the present embodiment, it is set to the vicinity of 3.0. Further, the electronic control unit 200 ignites the second air-fuel mixture at the optimal ignition timing and makes flame propagate from the second air-fuel mixture to the first air-fuel mixture to cause combustion of the stratified air-fuel mixture by flame propagation for operating of the engine body 1.

In this way, by temporarily forming the second air-fuel mixture with a relatively high fuel ratio in the vicinity of the electrode part 4a of the spark plug 4 and igniting the second air-fuel mixture, even in the case like the present embodiment of forming a lean stratified air-fuel mixture with an excess air rate more than 2.0 in the combustion chamber 16, it is possible to prevent misfires and secure combustion stability of the stratified air-fuel mixture. Further, the leaner the stratified air-fuel mixture is made, the more possible it is to lower the combustion temperature and reduce the amount of NOx exhausted.

On the other hand, if the excess air rate $\lambda_0$ of the stratified air-fuel mixture is the same, the smaller the excess air rate $\lambda_2$ of the second air-fuel mixture is made (the greater the degree of richness of the second air-fuel mixture), the more improved the combustion stability of the stratified air-fuel mixture, but the combustion temperature of the second air-fuel mixture and in turn the stratified air-fuel mixture becomes higher, so the amount of NOx exhausted increases.

Figure 4:
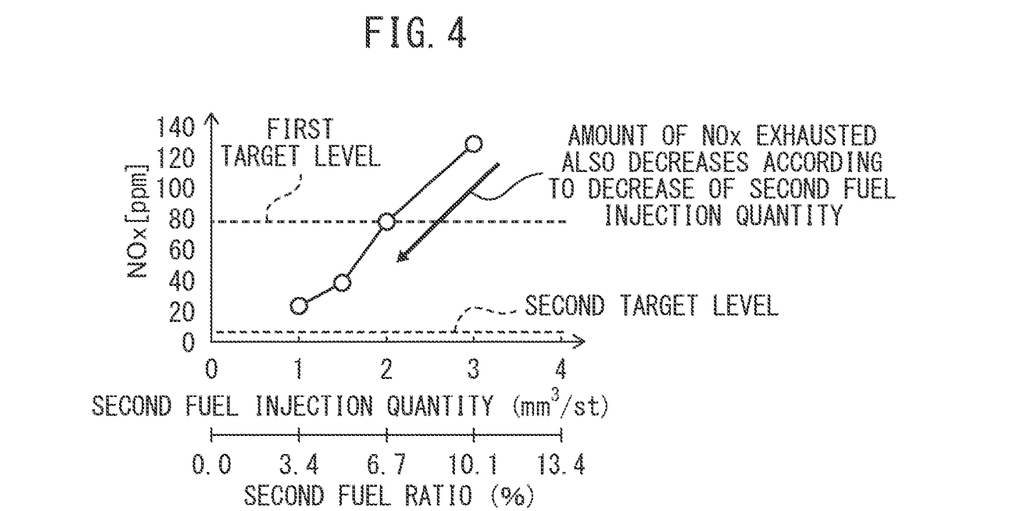
FIG. 4 is a view showing changes in an amount of NOx exhausted under the same operating conditions of engine load and engine speed, not changing the excess air rate $\lambda_0$ of a stratified air-fuel mixture, and changing only a second fuel injection quantity (mm$^3$/st), that is, an excess air rate $\lambda_2$ of the second air-fuel mixture.

FIG. 4 is a view showing changes in the amount of NOx exhausted under the same operating conditions of engine load and engine speed in the case of not changing the excess air rate $\lambda_0$ of the stratified air-fuel mixture (in this example, $\lambda_0$=2.7) but leaving it constant and changing only a second fuel injection quantity ($mm^3$/st (stroke)) so as to change the ratio of the second fuel injection quantity with respect to the total fuel injection quantity (in this example, about 30 $mm^3$/st) (below, referred to as the "second fuel ratio") %, that is, changing only the excess air rate $\lambda_2$ of the second air-fuel mixture.

As shown in FIG. 4, the smaller the second fuel injection quantity is made and the more the second fuel ratio is lowered, the smaller the degree of richness of the second air-fuel mixture becomes, so the more possible it is to lower the combustion temperature of the second air-fuel mixture and in turn the stratified air-fuel mixture to reduce the amount of NOx exhausted.

Further, FIG. 4 shows by the broken lines the first target level and the second target level of the amount of NOx exhausted at the time of the lean combustion mode. The first target level roughly corresponds to the amount of NOx exhausted when forming a homogenized air-fuel mixture leaner than the stoichiometric air-fuel ratio in the combustion chamber 16 and making the flame propagate for combustion as lean homogeneous combustion so as to reduce the amount of NOx exhausted and in that case making the homogeneous air-fuel mixture leaner until the limit of ignition by spark ignition. The second target level corresponds to the restricted value of the amount of NOx exhausted determined by European exhaust regulations (EURO7) which is a target value of the amount of NOx exhausted tougher than the first target level.

As shown in FIG. 4, it is learned that if the second fuel ratio is 10% or more like in a conventional internal combustion engine (see PTL 1), the first target level is also not achieved. Further, it is learned that to achieve the first target level, it is necessary to keep the second fuel injection quantity down to generally 2.0 $mm^3$/st (in terms of the second fuel ratio, 6 to 7%) or less. Further, it is learned that to achieve the second target level, the second fuel injection quantity has to be made further smaller than that.

In other words, to achieve the first target level, it is necessary to make the minimum injection quantity of the second fuel injector 3 a predetermined first injection quantity able to achieve the first target level or a lesser amount. To achieve the second target level, it is necessary to make the minimum injection quantity of the second fuel injector 3 a predetermined second injection quantity able to achieve the second target level or a lesser amount.

Note that the "minimum injection quantity" of the fuel injector is the minimum injection quantity at a full lift region of the fuel injector and the total fuel quantity injected in the period until switching from a partial lift region to the full lift region, that is, in the period until the amount of lift of the needle valve of the fuel injector (below, referred to as the "needle lift amount") changes from zero to the maximum lift amount. The "partial lift region" is the injection region where the needle lift amount of the fuel injector is smaller than the maximum lift amount, while the "full lift region" is the injection region after the needle lift amount of the fuel injector becomes the maximum lift amount.

Further, to stably ignite the second air-fuel mixture by the spark plug 4, to secure the time required for the combustion reaction, it is necessary to secure an overlap period of a predetermined time period or more between a time period in which the excess air rate $\lambda_2$ of the second air-fuel mixture is less than a predetermined excess air rate and a time period in which discharge is performed at the electrode part 4a of the spark plug 4. By experiments, it is learned that this predetermined excess air rate is generally about 1.3 and the predetermined time period is 250 μs or so.

Therefore, to stably ignite the second air-fuel mixture by the spark plug 4 while lowering the amount of NOx exhausted down to the first target level or the second target level, it is necessary to secure an injection timing of the second fuel injector 3 of a predetermined time period (250 μs) or more to maintain an excess air rate $\lambda_2$ of the second air-fuel mixture at less than a predetermined excess air rate while keeping the second fuel injection quantity down to the first injection quantity or the second injection quantity or less.

Here, as the method of lowering the minimum injection quantity of the second fuel injector 3, the method of adjusting the needle lift amount or injection port size, number of injection ports, fuel pressure, etc. of the second fuel injector 3 to reduce the injection quantity per unit time of the second fuel injector 3 (below, referred to as the "fuel injection rate") may be mentioned. However, if lowering the minimum injection quantity by reducing the fuel injection rate of the second fuel injector 3, the following such problems arise.

That is, if injecting the same quantity of fuel from the second fuel injector 3, the smaller the fuel injection rate of the second fuel injector 3 is made, the longer the time until that quantity of fuel finishes being injected from the second fuel injector 3. For this reason, if the fuel injection rate of the second fuel injector 3 is made too small, the second fuel will end up diffusing inside of the combustion chamber 16 while the second fuel is being injected from the second fuel injector 3 and it will become impossible to maintain the excess air rate $\lambda_2$ of the second air-fuel mixture at less than a predetermined excess air rate able to stably ignite the mixture by the spark plug 4.

On the other hand, if making the fuel injection rate of the second fuel injector 3 too large, if securing the injection timing of the second fuel injector 3 for a predetermined duration or more, it will become no longer possible to keep the second fuel injection quantity down to the first injection quantity or the second injection quantity or less.

From such a viewpoint, the fuel injection rate of the second fuel injector 3 has to be kept within a certain fixed range. By experiments, it was learned that by keeping the fuel injection rate of the second fuel injector 3 within the range of 1.0 mm³/ms to 3.0 mm³/ms, it is possible to secure the injection timing of the second fuel injector 3 for a predetermined duration (250 μs) or more to maintain the excess air rate $\lambda_2$ of the second air-fuel mixture at less than a predetermined excess air rate while keeping the second fuel injection quantity down to the first injection quantity or the second injection quantity or less.

Therefore, in the present embodiment, in a combustion cycle in a lean combustion mode in which the first fuel for forming a homogenized air-fuel mixture in the combustion chamber 16 is injected from the first fuel injector 2 and the second fuel (ignition-use fuel) for forming the second air-fuel mixture of the ignition-use air-fuel mixture in the vicinity of the electrode part 4a is injected from the second fuel injector 3 and lean combustion with an excess air rate of 2.0 or more is performed, the second fuel (ignition-use fuel) is injected by at least an injection rate of 1.0 mm³/ms or more for a duration of 250 μs or more in an interval from a crank angle advanced by exactly 20 degrees from an ignition timing of the spark plug to the ignition timing, and the fuel amount of the second fuel (ignition-use fuel) is 2.0 mm³/st or less.

In this way, by injecting the second fuel (ignition-use fuel) from the second fuel injector 3 toward the electrode part 4a of the spark plug 4 by an injection rate of 1.0 mm³/ms or more for a duration of 250 μs or more in an interval from a crank angle advanced by exactly 20 degrees from the ignition timing of the spark plug 4 to the ignition timing, it is possible to temporarily form the second air-fuel mixture of the ignition-use air-fuel mixture in the vicinity of the electrode part 4a and maintain the excess air rate $\lambda_2$ of the second air-fuel mixture at less than a predetermined excess air rate ($\approx 1.3$) able to stably ignite an ignition-use air-fuel mixture by a spark plug for at least a duration of 250 μs or more. For this reason, even in a combustion cycle in which lean combustion of an excess air rate of 2.0 or more is performed, it is possible to stably ignite the second air-fuel mixture by the spark plug 4, so it is possible to prevent misfires and secure combustion stability in the combustion cycle.

Further, the quantity of ignition-use fuel for forming the second air-fuel mixture of the ignition-use air-fuel mixture is made 2.0 mm³/st or less, so it is possible to keep the combustion temperature of the second air-fuel mixture down to a certain level or less. For this reason, the amount of NOx exhausted can be kept down to a certain level or less.

Therefore, according to the internal combustion engine 100 according to the present embodiment, even if performing lean combustion with an excess air rate of 2.0 or more, it is possible to secure combustion stability while keeping the amount of NOx exhausted down to a certain level or less.

Further, the engine body 1 of the internal combustion engine 100 according to the present embodiment is configured to enable a tumble flow flowing from the intake port 17 side opening at the top surface of the combustion chamber 16 toward the exhaust port 18 side to pass the electrode part 4a to be generated inside the combustion chamber 16. The second fuel injector 3 injects fuel directly toward the electrode part 4a in the same direction as the direction of the tumble flow.

Due to this, it is possible to ignite the second air-fuel mixture formed temporarily at the surroundings of the electrode part 4a and make the flame generated move to the combustion chamber 16 as a whole riding the tumble flow, so the flame is made to easily propagate to the combustion chamber 16 as a whole and enable combustion stability at the time of lean combustion to be secured more.

Second Embodiment

Next, a second embodiment of the present disclosure will be explained. The present embodiment differs from the first embodiment on the point of injecting cooling-use fuel for cooling the second fuel injector 3 by latent heat of vaporization in addition to the ignition-use fuel for forming the second air-fuel mixture. Below, this point of difference will be focused on in the explanation.

In the first embodiment, only a small quantity of ignition-use fuel is injected from the second fuel injector 3 for forming the second air-fuel mixture. For this reason, at the time of fuel injection, it is not possible to sufficiently cool the second fuel injector 3 by the latent heat of vaporization and the second fuel injector 3 is liable to become too high a temperature. As a result, for example, there is a liability of formation of deposits at the injection ports and heat deformation causing the injection performance of the second fuel injector 3 to fall.

Figure 5:
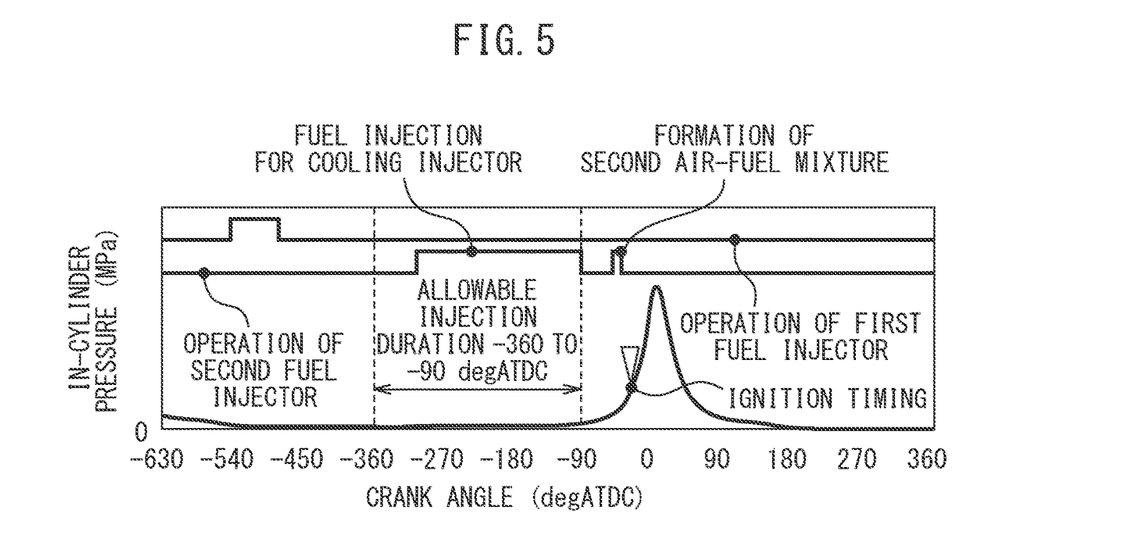
FIG. 5 is a view showing one example of fuel injection timings and ignition timings of the first fuel injector and the second fuel injector at the time of a lean combustion mode according to a second embodiment of the present disclosure plotting an in-cylinder pressure MPa at the ordinate and a crank angle deg. ATDC at the abscissa.

Therefore, in the present embodiment, as shown in FIG. 5, part of the first fuel which had been injected from the first fuel injector 2 at the time of the lean combustion mode in the first embodiment is made to be injected from the second fuel injector 3 as cooling-use fuel. Due to this, it is possible to cool the second fuel injector 3 by the latent heat of vaporization of the cooling-use fuel, so it is possible to keep the second fuel injector 3 from ending up becoming too high in temperature.

Note that as shown in FIG. 5, the cooling-use fuel is injected up to the first half of the time period, specifically, in the range of crank angle from −360 deg. ATDC to −90 deg. ATDC. The injection start timing of the cooling-use fuel is made at the earliest −360 deg. ATDC and the injection end timing is made at the latest −90 deg. ATDC in this way for the following reason.

That is, the cooling-use fuel injected from the second fuel injector 3 is also fuel for forming the first air-fuel mixture together with the fuel injected from the first fuel injector 2 and is part of the fuel for making the engine output torque the demanded torque. For this reason, if ending up injecting the cooling-use fuel into the combustion chamber 16 at a timing earlier than −360 deg. ATDC, that is, in the exhaust stroke in which the exhaust valve is open, the cooling-use fuel ends up being exhausted from the exhaust port 18 to outside the combustion chamber 16 and the engine output torque is liable to fall. Further, if injecting the cooling-use fuel at a timing later than −90 deg. ATDC, the time period until the ignition timing becomes shorter. This being so, the premixing time of the cooling-use fuel becomes insufficient and the first air-fuel mixture is no longer made to be sufficiently homogenized, so the unburned gases (HC, CO, etc.) increase and the exhaust emissions are liable to deteriorate.

If within the range of crank angle of −360 deg. ATDC to −90 deg. ATDC, there is no particular upper limit of the fuel quantity injected as the cooling-use fuel. It is sufficient to inject a quantity giving the required cooling efficiency as the cooling-use fuel. In the present embodiment, the total quantity of the ignition-use fuel and the cooling-use fuel injected from the second fuel injector 3 is one-third or less of the total fuel quantity injected from the first fuel injector 2 and the second fuel injector 3.

In the internal combustion engine 100 according to the present embodiment explained above, in a combustion cycle where first fuel for forming a homogenized air-fuel mixture is injected into the combustion chamber 16 from the first fuel injector 2, second fuel (ignition-use fuel) for forming a second air-fuel mixture of an ignition-use air-fuel mixture is injected to the vicinity of the electrode part 4a from the second fuel injector 3, and lean combustion is performed by an excess air rate of 2.0 or more, cooling-use fuel for cooling the second fuel injector 3 is injected from the second fuel injector 3 separate from the ignition-use fuel.

Due to this, the second fuel injector 3 can be cooled by the latent heat of vaporization of the cooling-use fuel, so it is possible to keep the second fuel injector 3 from ending up becoming too high in temperature.

Further, in the present embodiment, the cooling-use fuel is injected in the range of crank angle from 360 degrees before top dead center of the compression stroke (=−360 deg. ATDC) to 90 degrees before top dead center of the compression stroke (=−90 deg. ATDC).

Due to this, it is possible to keep the cooling-use fuel from being exhausted from the exhaust port 18 to outside the combustion chamber 16. Further, it is possible to secure the premixing time of the cooling-use fuel, so it is possible to keep the exhaust emissions from deteriorating.

Above, embodiments of the present disclosure were explained, but the above embodiments only shown some of the examples of applications of the present disclosure and are not intended to limit the technical scope of the present disclosure to the specific constitutions of the embodiments.

For example, in the above embodiments, the internal combustion engine 100 was provided with a first fuel injector 2 for forming a homogenized air-fuel mixture in the combustion chamber and a second fuel injector 3 for forming an ignition-use air-fuel mixture in the combustion chamber, but for example if a fuel injector able to simultaneously satisfy the injection performances sought from the first fuel injector 2 and the second fuel injector 3 and configured to be able to freely change the number of injection ports or amounts of needle lift, it is also possible to provide a single such fuel injector combining the first fuel injector 2 and the second fuel injector 3 to inject fuel into the combustion chamber.

Note that in the above embodiments, the reason for providing the first fuel injector 2 for forming a homogenized air-fuel mixture inside the combustion chamber separate from the second fuel injector 3 for forming an ignition-use air-fuel mixture into the combustion chamber is as follows.

As explained above, to stably ignite the second air-fuel mixture by the spark plug 4 while lowering the amount of NOx exhausted to the first target level or the second target level, it is necessary to secure the injection timing of the second fuel injector 3 for a predetermined duration (250 μs) or more and maintain the excess air rate $\lambda_2$ of the second air-fuel mixture at less than a predetermined excess air rate while keeping down the second fuel injection quantity to the first injection quantity or the second injection quantity or less. For this reason, it is necessary to keep the fuel injection rate of the second fuel injector 3 within a certain fixed range.

Further, this is because if keeping the fuel injection rate of the second fuel injector 3 within a certain fixed range, if trying to inject the first fuel for forming the homogenized air-fuel mixture in the combustion chamber without providing the first fuel injector 2 separately from the second fuel by the second fuel injector 3, when the demanded torque increases and the target fuel injection quantity increases, that is, when the fuel quantity for forming the homogenized air-fuel mixture for injection from the second fuel injector 3 (that is, the first fuel quantity) increases, the fuel injection rate falls and it becomes no longer possible to finish injecting the entire quantity of the fuel required for forming the homogenized air-fuel mixture within the fuel injection timing able to form a homogenized air-fuel mixture. For this reason, in the above embodiments, the first fuel injector 2 for forming a homogenized air-fuel mixture in the combustion chamber and the second fuel injector 3 for forming an ignition-use air-fuel mixture in the combustion chamber are both used.

Further, in the above embodiments, in all of the combustion cycles in which lean combustion is performed by an excess air rate of 2.0 or more, that is, in the entire engine operating region where lean combustion is performed by an excess air rate of 2.0 or more, there is no need to inject the second fuel by an injection rate of 1.0 mm$^3$/ms or more for a duration of 250 μs or more in the interval between a crank angle advanced by exactly 20 degrees from the ignition timing of the spark plug to the ignition timing and make the quantity of the second fuel (ignition-use fuel) 2.0 mm$^3$/st or less. It is also possible to make the injection rate or injection timing and injection quantity of the second fuel the above values only for part of the combustion cycles where lean combustion of an excess air rate of 2.0 or more is performed, for example, a predetermined engine operating region in which it is desired to secure the combustion stability while suppressing exhaust of NOx.

The invention claimed is:

1. An internal combustion engine comprising:
an engine body,
a spark plug in which an electrode part is placed so as to approach a combustion chamber of the engine body,
a first fuel injector injecting fuel into an intake passage or combustion chamber of the engine body,
a second fuel injector injecting fuel into the combustion chamber, and
an electronic controller configured to control the first fuel injector and the second fuel injector such that:
  in a combustion cycle in which fuel for forming a homogenized air-fuel mixture in the combustion chamber is injected from the first fuel injector, ignition-use fuel for forming an ignition-use air-fuel mixture in the vicinity of the electrode part is injected from the second fuel injector, and lean combustion is performed by an excess air rate of 2.0 or more,
  the ignition-use fuel is injected by at least an injection rate of 1.0 mm$^3$/ms or more for a duration of 250 μs or more in an interval from a crank angle advanced by exactly 20 degrees from an ignition timing of the spark plug to the ignition timing, and
  the quantity of the ignition-use fuel is 2.0 mm$^3$/st or less.

2. The internal combustion engine according to claim 1, wherein in the combustion cycle, cooling-use fuel for cooling the second fuel injector is injected from the second fuel injector separate from the ignition-use fuel.

3. The internal combustion engine according to claim 2, wherein the cooling-use fuel is injected within a range of crank angle from 360 degrees before top dead center of the compression stroke to 90 degrees before top dead center of the compression stroke.

4. The internal combustion engine according to claim 1, wherein
the engine body is configured so that it can generate inside the combustion chamber a tumble flow flowing in a direction from an intake port side opening at a top surface of the combustion chamber toward an exhaust port side and passing the electrode part, and
the second fuel injector directly injects fuel toward the electrode part in the same direction as the direction of the tumble flow.

* * * * *